(12) United States Patent
Holt et al.

(10) Patent No.: US 8,660,993 B2
(45) Date of Patent: Feb. 25, 2014

(54) USER FEEDBACK FOR SEARCH ENGINE BOOSTING

(75) Inventors: Alexander W. Holt, New Paltz, NY (US); Michael E. Moran, Ridgewood, NJ (US); Jeffrey S. Schaffer, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 11/961,268

(22) Filed: Dec. 20, 2007

(65) Prior Publication Data
US 2009/0164446 A1   Jun. 25, 2009

(51) Int. Cl.
*G06F 7/06* (2006.01)
*G06F 17/30* (2006.01)

(52) U.S. Cl.
USPC .......................................................... 707/663

(58) Field of Classification Search
USPC .............. 707/5, 999.005, 705, 722, 723, 7, 707/999.007, 999.102, 999.107, 706, 748, 707/661, 662, 999.003, 663, 666
See application file for complete search history.

(56) References Cited

U.S. PATENT DOCUMENTS

| | | | |
|---|---|---|---|
| 6,327,590 B1 | 12/2001 | Chidlovskii et al. | |
| 7,003,513 B2 | 2/2006 | Geiselhart | |
| 2004/0205065 A1* | 10/2004 | Petras et al. | 707/5 |
| 2005/0210025 A1 | 9/2005 | Dalton et al. | |
| 2006/0010117 A1 | 1/2006 | Bonabeau et al. | |
| 2006/0026147 A1 | 2/2006 | Cone et al. | |
| 2007/0112758 A1 | 5/2007 | Livaditis | |
| 2009/0070336 A1* | 3/2009 | Wiechers et al. | 707/10 |
| 2009/0157667 A1* | 6/2009 | Brougher et al. | 707/5 |

OTHER PUBLICATIONS

Vassilvitskii, S & Brill, E. "Using Web-Graph Distance for Relevance Feedback in Web Search", SIGIR '06, Aug. 6-11, 2006, Seattle, Washington. pp. 147-153.
U, R. & Varma, V. "A Novel Approach for Re-Ranking of Search Results Using Collaborative Filtering", Proceedings of the International Conference on Computing: Theory and Applications, 2007.

* cited by examiner

*Primary Examiner* — Bruce Moser
(74) *Attorney, Agent, or Firm* — Andrea Bauer; Hoffman Warnick LLC

(57) ABSTRACT

A system, method and program product for that utilizes user feedback as a boosting mechanism for closed loop content space search processes, such as site-specific web search engines. A search engine is disclosed that includes: a system for searching a database of content items such as web pages; a data collection system for collecting user feedback from users viewing displayed content items regarding information appearing in said displayed content items; a scoring system for assigning a score to content items from the database based on the user feedback; and a system for ranking a set of search results based on the score assigned to content items in the set of search results.

25 Claims, 2 Drawing Sheets

USER FEEDBACK FOR SEARCH ENGINE BOOSTING

FIELD OF THE INVENTION

This disclosure relates generally to search engines, and more specifically relates to a system, method and program product that utilizes user feedback as a boosting mechanism for site-specific web search engines and other closed loop content space search engines.

BACKGROUND OF THE INVENTION

An important goal of any web-based search engine involves determining the best pages to return in response to a query. Various factors are often utilized to "boost" the importance of web pages in order to have the best pages appear higher up in the search results. For public search engines that search web pages across the entire web, relative popularity of relevant web pages is often used as a boost factor, i.e., the more often a page is viewed, the higher it should appear in the results of a given query. Another technique involves tracking the number of click-thru's for search results, and boosting the pages that receive the most. This particular technique has limitations in that it leads to a closed feedback loop in which lower results have no ability to increase their standing since users rarely look beyond the first five or so results.

Implementing effective boosting techniques becomes even more challenging for site specific search engines, such as company search engines, that allow users to search pages within a specific portal or site. One technique is to have the site owner select pages that are known to have good content for particular queries. However, this technique does not scale well for sites having thousands of pages and changing content. Two of the most useful recent innovations, link popularity and anchor text, do not work well for a site specific search engine because such information is not likely to be present as a site specific search does not crawl and index pages outside of its own domain. Accordingly, the current state of the art has limited techniques for boosting web pages in a site specific search engine.

SUMMARY OF THE INVENTION

The present invention relates to a system, method and program product that utilizes user feedback as a boosting mechanism for closed loop content space search processes, such as site-specific web search engines. In one embodiment, there is a search engine that utilizes feedback to rank search results, comprising: a system for searching a database of content items; a data collection system for collecting user feedback from users viewing displayed content items regarding information appearing in said displayed content items; a scoring system for assigning a score to content items from the database based on the user feedback; and a system for ranking a set of search results based on the score assigned to content items in the set of search results.

In a second embodiment, there is a program product stored on a computer readable medium for providing a search engine that utilizes feedback to rank search results, comprising: program code for searching a database of content items; program code for collecting user feedback from users viewing displayed content items regarding information appearing in said displayed content items; program code for assigning a score to content items from the database based on the user feedback; and program code for ranking a set of search results based on the score assigned to content items in the set of search results.

In a third embodiment, there is a method of utilizing feedback to rank search results, comprising: collecting user feedback from users viewing displayed web pages regarding content appearing in said displayed web pages; searching a database of web pages; assigning a score to web pages from the database based on the user feedback; and ranking a set of search results based on the score assigned to web pages in the set of search results.

In a fourth embodiment, there is a method of utilizing feedback to rank search results, comprising: collecting user feedback from users viewing displayed content items regarding information appearing in said displayed content items; searching a database of content items; assigning a score to content items from the database based on the user feedback; and ranking a set of search results based on the score assigned to content items in the set of search results.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
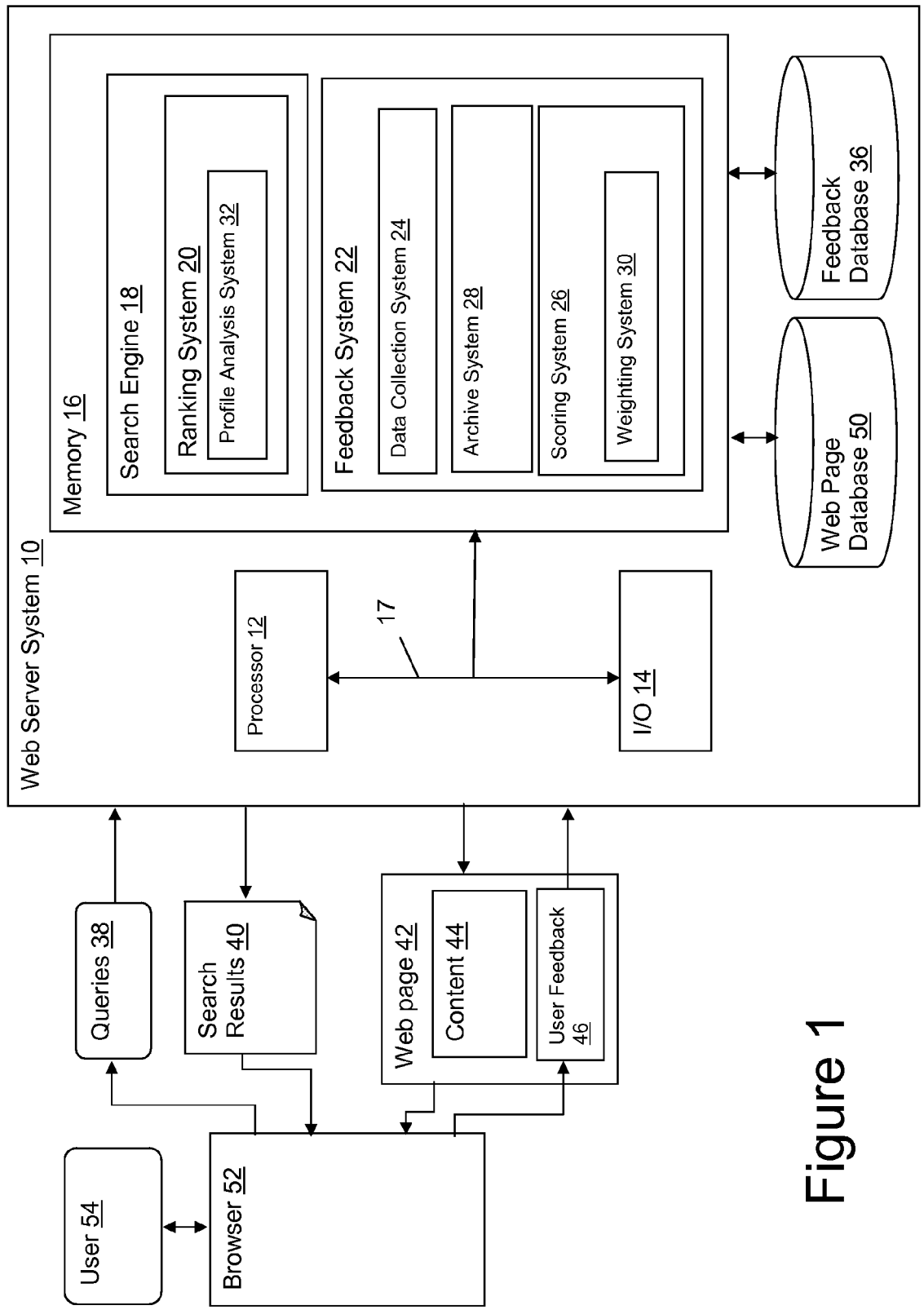
FIG. 1 depicts a web search system in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

FIG. 1 depicts a web server system 10 having a search engine 18 for searching a web page database 50 associated with a website served by web server system 10. The search engine 18 allows users to search for content items at a unique website (as opposed to the entire web) such as a company website, a retail website, an educational website, a portal, etc. Although described herein with reference to an engine for searching web pages, it is understood that the present invention can be used to enhance the searching of all types of content items (e.g., media files, non-HTML files, word processing documents, etc.) in any closed loop content space. A closed loop content space is generally defined as any database or collection of content items that is maintained and controlled by a distinct entity or set of entities.

As shown, queries 38 are submitted from a browser 52 to the search engine 18, which utilizes a ranking system 20 to generate and return a set of ranked search results 40. In order to enhance the ranking of search results 40, a feedback system 22 is utilized that analyzes user feedback 46 provided by a user 54 viewing a web page 42. In particular, feedback system 22 provides a "normalized" score to the ranking system 20, which can be used as a factor in boosting search results 40 in the ranking. As described in further detail herein, based on the content 44 appearing on the web page 42, user 54 is able to submit user feedback 46, e.g., a rating, a response, a value, etc. In addition, ranking system 20 may include a profile analysis system 32 that analyzes a profile or segment of the user, e.g., a customer vs. a non-customer, etc., to rank search results.

Feedback system 22 generally includes: a data collection system 24 for collecting and storing information in feedback database 36 including the user feedback 46, as well as other data, e.g., the web page 42 being viewed, metadata, date and time, profile data, etc.; an archive system 28 that, e.g., eliminates user feedback data/scores after a web page has been removed or a certain amount of time has passed; and a scoring system 26 for converting the user feedback 46 into a score for each web page in the web page database 50.

As noted, data collection system 24 collects both user feedback 46 and other related information. User feedback 46 generally comprises a response to a question associated with web page content being displayed, e.g., "was this helpful—yes or no?", "rate this page on a scale of 1-5," etc. User feedback 46 is collected when, e.g., a user clicks on a selection presented in the web page 42.

Figure 2:
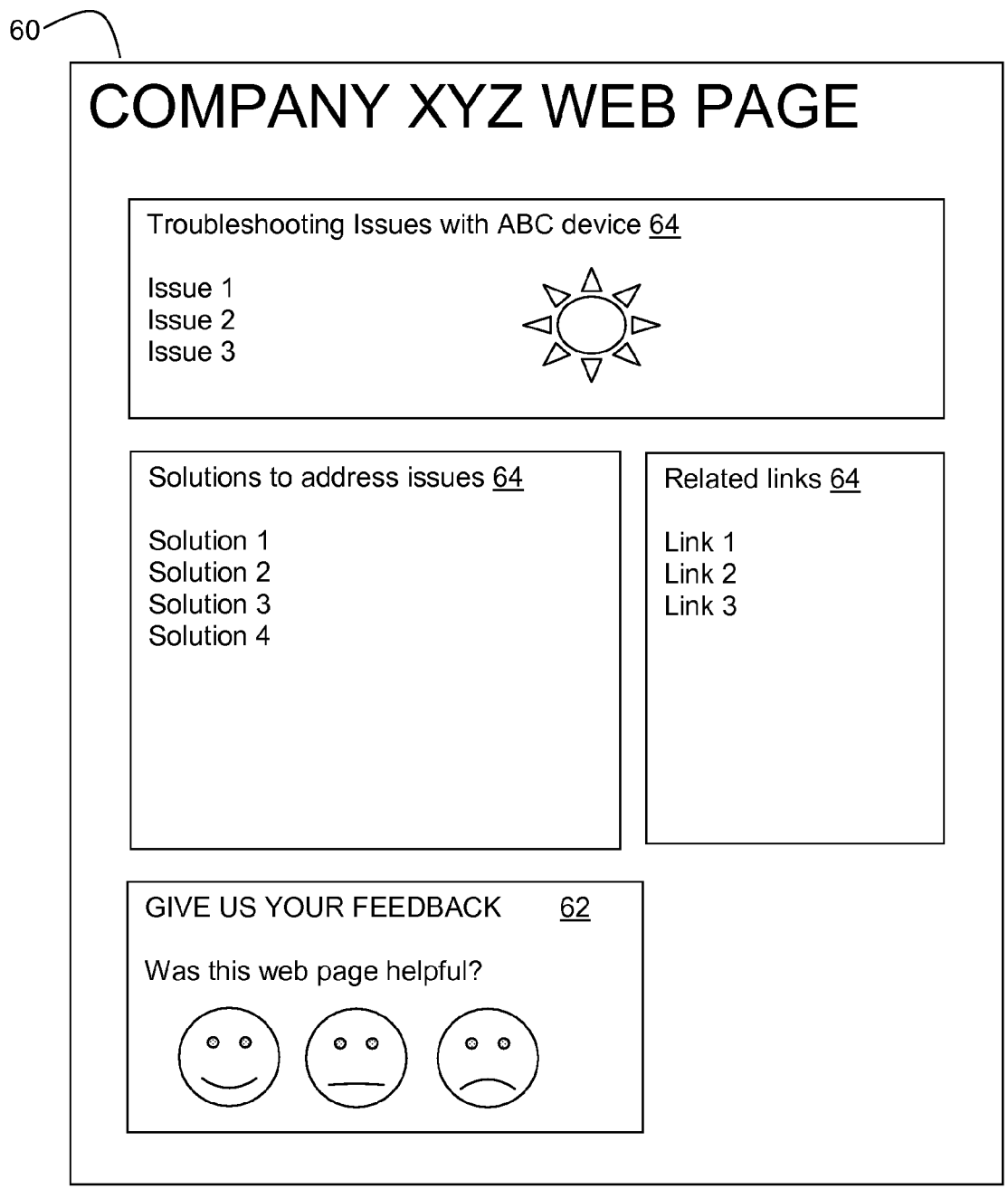
FIG. 2 depicts an illustrative interface for collecting user feedback in accordance with an embodiment of the present invention.

FIG. 2 depicts a web page 60 in which the user feedback 62 is collected by presenting three faces (happy, indifferent, and unhappy). If the user 54 found the content 64 in web page 60 to be helpful, the user could click the happy face; if not helpful, the user 54 could click the unhappy face; if not sure, the user could click the indifferent face. The resulting click is then collected by the data collection system 24 and is stored in feedback database 36 (FIG. 1). User feedback 46 is typically converted to some numeric value. For instance, a happy face could have a value of +1, an indifferent face could have a value of 0, and an unhappy face could have a value of −1.

Obviously, the example shown in FIG. 2 is for illustrative purposes only, and any type of feedback request and/or interface for collecting user feedback could be used. For instance, there could be more than three faces representing varying degrees of user satisfaction, a yes/no question, a letter grade, etc. Moreover, user feedback 46 (FIG. 1) could be collected from a pop-up window, a separate dialog box, a voice command, etc.

In addition to collecting user feedback 46, feedback collection system 24 also collects other related information. For example, data collection system 24 may collect a URL of the web page being rated, time and date information of when the user feedback 46 was collected, metadata from the web page 42, identification and profile information about the user 54, etc. User identification information may be collected in order to, e.g., limit the number of responses a given user can submit for each web page.

Archive system 28 provides a mechanism for archiving or eliminating stale data. For example, if the content 44 in web page 42 is changed, then the feedback values associated with the old web page may be archived, modified or completely eliminated from feedback database 36. Similarly, aging scores may also be archived, modified or eliminated from the feedback database 36. In some cases, a score for a web page could be automatically revived if a user revisits a page after the score previously submitted by the user was archived. In addition, the time for which a score "ages out" can vary, e.g., based on the number of visitors. For instance, scores for a high traffic web page may age out faster than low traffic web page.

Scoring system 26 provides a mechanism for scoring each web page in the web page database 50 based on the user feedback 46. The resulting score may be implemented as a boost factor that is applied with other ranking factors by ranking system 20. For instance, web pages that receive overall positive feedback could receive a positive boost factor and web pages that receive overall negative feedback could receive a negative boost factor.

Scores, which indicate a quality metric about the content of the web page, can be calculated in any manner. For example, scoring system 26 could take an average of all feedback values received for a given web page. The resulting value could then be further transformed or normalized to a score that can be readily utilized by the ranking system 20.

Weighting system 30 provides a mechanism for modifying or weighting feedback values/scores. For instance, if a large number of visitors rate a given web page, then the average feedback value could be weighted higher or lower than if a low number of visitors rate the web page. Weighting could also take place as result of a user profile, e.g., known purchaser feedback values could be weighted higher than feedback values of someone just browsing.

Scores can be calculated dynamically, e.g., as web pages are identified by the search engine 18, or statically, e.g., from time to time. Dynamic calculation may be implemented as follows. When search engine 18 processes a query 38, content is captured (i.e., crawled or pushed) from web page database 50 and put into a search index. Ranking system 20 applies a score to each located document as a field in the index. Each score may then be further transformed or normalized into a boost factor that ranking system 20 can use in determining relative position of located web pages for the query 38.

Web pages that do not have a score, or enough feedback to get a consistent score, may be given an average score for all web pages in the search results or entire web page feed back database 36. Web pages with scores above average would receive a positive boost in the result set. Web pages with scores below average would receive a negative boost in the result set. The way the ranking system 20 applies boosting factors determines how the scores are normalized and is dependent on the particular search engine implementation and ranking algorithm.

Profile analysis system 32 may be utilized to determine user profiles of both searchers and raters to, e.g., identify patterns for different user segments. For instance, when a searcher falls into a known profile, a rating associated for the profile could be used impact rankings. Profiles may be determined, e.g., based on login information.

Note that while this illustrative embodiment is directed at searching content associated with a site specific website, the invention could be applied to searching third party content, as well as public web searching. As such, web page database 50 may comprises a single database or a distributed database, such as the World Wide Web.

It is understood that web server system 10 may be implemented as any type of computing infrastructure. Such a computing infrastructure generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the web server system 10 and likewise may comprise any known type of transmission link, including electrical, optical, wireless, etc. Although not shown, additional components, such as cache memory, communication systems, system software, etc., may be incorporated.

Access to web server system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a web server system 10 comprising a ranking system 20 could be created, maintained and/or deployed by a service provider that offers the functions described herein for customers. That is, a service provider could offer to deploy or provide the ability to rank search results 40 using feedback as described above.

It is understood that in addition to being implemented as a system and method, the features may be provided as a program product stored on a computer-readable medium, which when executed, enables web server system 10 to provide a site-specific search engine 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A computerized web server system that utilizes feedback to rank a set of search results for a single-website specific search, the system comprising:
   a system for searching a database of content items associated with a single website;
   a data collection system for collecting user feedback from users viewing displayed content items, the user feedback being solely based on informational content appearing in said displayed content items, the displayed content items associated with the single website;
   an archive system for archiving the user feedback and removing at least a portion of the user feedback from the archive system in response to a predetermined time period elapsing, wherein the archive system further archives the user feedback associated with any content items that have been changed;
   a scoring system for assigning a score to content items from the database based on the user feedback currently in the archive system, wherein the score is based solely on user feedback, which is based solely on informational content appearing in said displayed content items; and
   a system for ranking the set of search results based on the score assigned to content items in the set of search results.

2. The computerized web server system of claim 1, wherein the single website is selected from the group consisting of: a single retail website, a single educational website and a single portal website.

3. The computerized web server system of claim 1, wherein the database of content items comprises a distributed database.

4. The computerized web server system of claim 1, wherein the data collection system further collects date/time information, user information, and web page information.

5. The computerized web server system of claim 1, wherein the data collection system includes an embedded question in displayed content items.

6. The computerized web server system of claim 1, wherein the scoring system determines the score for a content item based on an average value of all feedback received for the content item.

7. The computerized web server system of claim 6, wherein the scoring system weights the score based on a factor selected from the group consisting of: a number of responses, timing of when responses were received, and profile information of the user submitting the response.

8. The computerized web server system of claim 1, wherein the scoring system assigns an average score to content items that have no user feedback.

9. A program product stored on a non-transitory computer readable medium for providing a search engine that utilizes feedback to rank a set of search results for a single-website specific search, comprising:
  program code for searching a database of content items associated with a single website;
  program code for collecting user feedback from users viewing displayed content items content items, the user feedback being solely based on informational content appearing in said displayed content items, the displayed content items associated with the single website;
  program code for archiving the user feedback and removing at least a portion of the user feedback from an archive in response to a predetermined time period elapsing, wherein the program code for archiving further archives the user feedback associated with any content items that have been changed;
  program code for assigning a score to content items from the database based on the user feedback currently in the archive, wherein the score is based solely on user feedback, which is based solely on informational content appearing in said displayed content items; and
  program code for ranking the set of search results based on the score assigned to content items in the set of search results.

10. The program product of claim 9, wherein the single website is selected from the group consisting of: a single retail website, a single educational website and a single portal website.

11. The program product of claim 9, wherein the database of content items comprises a distributed database.

12. The program product of claim 9, wherein the user feedback further includes date/time information, user information, and web page information.

13. The program product of claim 9, wherein the user feedback is obtained from an embedded question in a displayed content item.

14. The program product of claim 9, wherein the score for a content item is based on an average value of all feedback received for the content item.

15. The program product of claim 14, wherein the score is based on a factor selected from the group consisting of: a number of responses, timing of when responses were received, and profile information of the user submitting the response.

16. The program product of claim 9, wherein the scoring system assigns an average score to content items that have no user feedback.

17. A method of utilizing feedback to rank a set of search results for a single-website specific search, comprising:
  collecting user feedback from users viewing displayed content items, the user feedback being solely based on informational content appearing in said displayed content items associated with a single website;
  searching a database of content items, the displayed content items associated with the single website;
  archiving the user feedback and removing at least a portion of the user feedback from an archive in response to a predetermined time period elapsing, wherein the archiving further includes archiving the user feedback associated with any content items that have been changed;
  assigning a score to content items from the database based on the user feedback currently in the archive, wherein the score is based solely on user feedback, which is based solely on informational content appearing in said displayed content items; and
  ranking the set of search results based on the score assigned to content items in the set of search results.

18. The method of claim 17, wherein the single website is selected from the group consisting of: a single retail website, a single educational website and a single portal website.

19. The method of claim 17, wherein the database of content items comprises a distributed database.

20. The method of claim 17, wherein the user feedback collects date/time information, user information, and web page information.

21. The method of claim 17, wherein the user feedback is obtained from an embedded question in displayed content items.

22. The method of claim 17, wherein the score for a content item is based on an average value of all feedback received for the content item.

23. The method of claim 22, wherein the score is based on a factor selected from the group consisting of: a number of responses, timing of when responses were received, and profile information of the user submitting the response.

24. The method of claim 22, wherein an average score is applied to content items that have no user feedback.

25. A method for deploying a system for utilizing feedback to rank a set of search results for a single-website specific search, comprising:
  providing a computer infrastructure being configured to:
    search a database of web pages associated with a single website;
    collect user feedback from users viewing displayed web pages associated with the single website, the user feedback being solely based on informational content appearing in said displayed web pages;
    archive the user feedback and remove at least a portion of the user feedback from an archive in response to a predetermined time period elapsing, wherein the archiving further includes archiving the user feedback associated with any content items that have been changed;
    assign a score to web pages from the database based on the user feedback currently in the archive, wherein the score is based solely on user feedback, which is based solely on informational content appearing in said displayed content items; and
    rank the set of search results based on the score assigned to web pages in the set of search results.

* * * * *